(12) United States Patent
Sapper et al.

(10) Patent No.: US 6,177,487 B1
(45) Date of Patent: Jan. 23, 2001

(54) AQUEOUS POWDER PAINT DISPERSIONS

(75) Inventors: Ekkehard Sapper, Ostbevern; Joachim Woltering, Münster, both of (DE)

(73) Assignee: BASF Coatings AG, Muenster-Hiltrup (DE)

(*) Notice: Under 35 U.S.C. 154(b), the term of this patent shall be extended for 0 days.

(21) Appl. No.: 09/068,046

(22) PCT Filed: Oct. 19, 1996

(86) PCT No.: PCT/EP96/04553

§ 371 Date: Jun. 11, 1998

§ 102(e) Date: Jun. 11, 1998

(87) PCT Pub. No.: WO97/17390

PCT Pub. Date: May 15, 1997

(30) Foreign Application Priority Data

Nov. 3, 1995 (DE) .............................. 195 40 977

(51) Int. Cl.⁷ .............................. C08K 3/20; C08L 63/02
(52) U.S. Cl. .............................. 523/333; 523/408
(58) Field of Search ..................... 523/333, 408

(56) References Cited

U.S. PATENT DOCUMENTS

| | | | | |
|---|---|---|---|---|
| 4,176,124 | * | 11/1979 | Darm et al. ....................... | 260/346.3 |
| 5,714,264 | * | 10/1995 | Sacharski . | |

FOREIGN PATENT DOCUMENTS

| | | | |
|---|---|---|---|
| 28 38 842 A1 | 9/1978 | (DE) .............................. | C09G/59/52 |
| 42 22 194 A1 | 7/1992 | (DE) .............................. | C09D/5/46 |
| 43 30 404 A1 | 9/1993 | (DE) .............................. | C09D/5/46 |
| 43 41 235 A1 | 12/1993 | (DE) .............................. | C09D/5/46 |
| 43 06 102 A1 | 9/1994 | (DE) .............................. | C09D/5/46 |
| 195 23 084 A1 | 6/1995 | (DE) .............................. | C09D/5/46 |
| 196 18 657 A1 | 5/1996 | (DE) .............................. | C09D/5/46 |
| WO 95/28448 | 4/1995 | (EP) .............................. | C09D/5/03 |
| 1 521 354 | 3/1976 | (GB) .............................. | C08J/3/06 |

OTHER PUBLICATIONS

Grant & Hackh's, Chemical Dictionary Fifth Edition, p. 533, column one.

* cited by examiner

Primary Examiner—Robert Dawson
Assistant Examiner—D. Aylward

(57) ABSTRACT

The invention relates to aqueous powder coating dispersions based on epoxy resins, consisting of a solid, pulverulent component I and an aqueous component II, component I being a powder coating comprising:

A) at least one epoxy resin having an epoxide equivalent weight of from 300 to 5500 daltons, B) at least one di- and/or polycarboxylic acid as curing agent, comprising one or more organosilyl groups in the molecule, if desired in a mixture with other di- and/or polycarboxylic acids which contain no organosilyl group as substituent, and C) if desired, catalysts, fillers, auxiliaries and/or additives specific to powder coating, such as degassing agents, leveling agents, free-radical scavengers, antioxidants and/or UV absorbers, and component II being an aqueous dispersion comprising:

D) at least one nonionic thickener and

E) if desired, catalysts, auxiliaries, defoaming agents, dispersion auxiliaries, wetting agents, preferably carboxyl-containing dispersants, anti-oxidants, UV absorbers, free-radical scavengers, small quantities of solvents, leveling agents, biocides and/or water-retention agents.

22 Claims, No Drawings

AQUEOUS POWDER PAINT DISPERSIONS

FIELD OF THE INVENTION

The invention relates to the use of organosilyl-containing di- and/or polycarboxylic acids as crosslinking agents in aqueous powder coating dispersions which contain, as binders, polymers containing epoxide groups.

BACKGROUND OF THE INVENTION

Powder coatings are known. They are mostly employed in situations where environmental problems caused by the solvent content of the coating materials are in the forefront. The avoidance of high solvent contents in the coating materials is in the forefront, in particular, in the coating of car bodies, in the coating of unformed metal sheets (coil coating) and in the coating of metallic packaging containers (can coating).

DE-A-43 06 102, for example, describes powder coatings based on carboxyl-containing polyesters and compounds having more than one epoxide group per molecule as crosslinking agents, which in addition, as binders, contain one or more acrylicized polyurethane resin(s). Such powder coatings are suitable for the coating of metal sheets which following the coating procedure are to be formed, and couple high hardness with a high level of deformability and flexibility, and also provide good corrosion protection and good decorative properties, for example gloss.

Powder coatings based on carboxyl-containing polyesters, low molecular mass curing agents containing epoxide groups, polyacrylate resins containing epoxide groups, and low molecular mass di- and/or polycarboxylic acids and/or their anhydrides are described by DE-A-43 30 404. These powder coatings are suitable, again, in particular for the coating of metal sheets which are to be formed following the coating procedure, the coatings again coupling high hardness with a high level of flexibility and deformability without cracking, in addition to good optical properties.

DE-A-43 41 235 comprises powder coatings which are suitable for the finishing of car bodies and which contain, as binders, at least one polyacrylate resin which contains epoxide groups and siloxane-containing comonomer constituents. The powder coatings described in DE-A-43 41 235 lead to coatings having good surface properties, for example weathering stability, chemical resistance, scratch resistance and insensitivity to dirt.

DE-A-42 22 194 describes a process for producing a two-coat finish and powder coatings suitable for this process, where the powder coatings contain as binder a polyacrylate resin containing epoxide groups and as crosslinking agent a mixture of a polyanhydride and a carboxyl-containing polyester resin. Such powder coatings are applied as transparent powder coating, in the two-coat finishing of, in particular, automotive components, to a pigmented basecoat and are stoved together with the latter.

On the grounds of solvent avoidance in particular, efforts have been made to an increased extent in recent years to employ powder coatings as described above, for example, for coatings of a wide variety of types. The results, however, have often been unsatisfactory since, in order to achieve a uniform appearance when using powder coatings, relatively high film thicknesses are generally necessary. In addition, the use of pulverulent coating materials necessitates a different application technology, which has the consequence that the plants set up for liquid coating materials can no longer be used.

The aim is therefore to develop powder coatings in the form of aqueous dispersions which can be processed using application technologies for liquid coating materials.

For example, the as yet unpublished German Patent Application P 195 23 084.1 describes aqueous powder coating dispersions based on epoxy resins as binders and on phenolic compounds and/or carboxyl-containing polyesters as hardeners for the coating of packaging containers. The aqueous powder coating dispersion is composed in this case of a solid pulverulent component, comprising binder and hardener, and of an aqueous component comprising a nonionic or anionic thickener and, if desired, further additives specific to dispersions. Such aqueous powder coating dispersions can be applied, in connection with the coating of packaging containers, using the liquid-coating technology employed to date.

The as yet unpublished German Patent Application P 195 18 392.4 claims an aqueous powder coating dispersion which is particularly suitable as a coating for car bodies coated with aqueous basecoat. In this case the aqueous powder coating dispersion is again composed of a solid pulverulent component comprising at least one binder which contains epoxide groups and has a content of from 30 to 45% by weight of glycidyl-containing monomers, and a crosslinking agent comprising preferably straight-chain, aliphatic dicarboxylic acids and/or carboxyl-containing polyesters, and of an aqueous component comprising at least one nonionic thickener and, if desired, further additives specific to dispersions. Such aqueous powder coating dispersions can be applied to car bodies with the liquid-coating technology used hitherto and can, in particular, be stoved even at temperatures of 130 degrees C.

SUMMARY OF THE INVENTION

The aqueous powder coating dispersions according to German Patent Applications P 195 23 084.1 and P 195 18 392.4 can be applied, in connection with the coating of packaging containers and, respectively, of car bodies, using the methods of in each case existing liquid-coating technologies. Compared with the traditional solvent-dissolved two-component clearcoats, however, such aqueous powder coating dispersions have the disadvantage that the powder coating dispersions exhibit leveling which is poorer than that of solvent-containing systems, owing to the solid particles which are present in the dispersion and which do not readily coalesce in the course of film formation. Moreover, the coats of paint formed from powder coating dispersions have a substantially greater permeability for water vapor, which results frequently in a marked reduction in the condensation resistance, even in conjunction is with any underlying basecoat layers. Moreover, a slightly poor weathering stability is found with the coats of paint formed from the powder coating dispersions, which is particularly significant for the coating of car bodies.

The problem which results from this, namely to provide solvent-free coating systems based on aqueous powder coating dispersions insuring good leveling, high condensation resistance and good weathering stability in addition to high chemical resistance, a high surface quality of the coating, such as gloss and scratch resistance, and high thermal resistance of the coating, is surprisingly solved by the powder coating dispersions described in the text below.

The novel powder coating dispersions consist of a solid, pulverulent component I and an aqueous component II, component I being a powder coating comprising:

A) at least one epoxy resin having an epoxide equivalent weight of from 300 to 5500 daltons, B) at least one di- and/or polycarboxylic acid as curing agent, comprising one or more organosilyl groups in the molecule, if desired in a mixture with other di- and/or polycarboxylic acids which contain no organosilyl group as substituent, and C) if desired, catalysts, fillers, auxiliaries and/or additives specific to powder coating, such as degassing agents, leveling agents, free-radical scavengers, antioxidants and/or UV absorbers, and component II being an aqueous dispersion comprising:

D) at least one nonionic thickener and

E) if desired, catalysts, auxiliaries, defoaming agents, dispersion auxiliaries, wetting agents, preferably carboxyl-containing dispersants, antioxidants, UV absorbers, free-radical scavengers, small quantities of solvents, leveling agents, biocides and/or water-retention agents.

Moreover, the present invention also comprises a process for the preparation of an aqueous powder coating dispersion, in which process the pulverulent components are admixed to the aqueous component by wet milling or by stirring in.

In preferred embodiments of the invention, component I of the novel powder coating dispersion comprises from 50 to 95% by weight, preferably from 70 to 85% by weight, based on the powder coating, of component A) and from 5 to 50% by weight, preferably from 15 to 30% by weight, based on the powder coating, of component B), and component II of the powder coating dispersion comprises from 0.1 to 10% by weight, preferably from 1 to 3% by weight, based on the powder coating dispersion, of component D).

DETAILED DESCRIPTION OF THE INVENTION

The components of the aqueous powder coating dispersion

The epoxy resins employed as component A) are solid epoxy resins having an epoxide equivalent weight of from 300 to 5500 daltons.

Epoxy resins suitable as component A) are aromatic, aliphatic and/or cycloaliphatic, it being possible, for example, to employ aromatic epoxy resins based on bisphenol A and/or bisphenol F and/or epoxy resins of novolak type. Such epoxy resins based on bisphenol A or bisphenol F in general have epoxide equivalent weights of between 500 and 2000 daltons. Epoxy resins of the novolak type have, for example, epoxide equivalent weights of from 500 to 1000 daltons. Epoxy resins of the bisphenol A or the bisphenol F type have, in general, a functionality of not more than 2, and epoxy resins of the novolak type have a functionality of at least 2. However, it is also possible to bring epoxy resins based on bisphenol A or bisphenol F to a functionality of more than 2 by means of branching, for example using trimethylolpropane, glycerol, pentaerythritol or other branching reagents. It is of course also possible to employ other epoxy resins, for example alkylene glycol glycidyl ethers or their branched follow-on products, or epoxy resins based on bisphenol A or bisphenol F and flexibilized with alkylene glycols. Also suitable, furthermore, are mixtures of various of the epoxy resins mentioned. Suitable epoxy resins are, for example, the products available commercially under the following names: Epikote® 154, 1001, 1002, 1004, 1007, 1009, 1055, 3003-4F-10 from Shell Chemie, XZ 86 795 and also DER® 662, 664, 667, 669, 642U and 672U from Dow, and also Araldit® GT 6064, GT 7004, GT 7072, GT 7097, GT 7203, GT 7220 and GT 7304 from Ciba-Geigy.

For coatings with the novel powder coating dispersions in the packaging sector, FDA-approved epoxy resins are particularly preferred.

For coatings in the automotive sector, examples of suitable epoxy resins employed preferably as component A) are polyacrylate resins which contain epoxide groups and can be prepared by copolymerizing at least one ethylenically unsaturated monomer which contains at least one epoxide group in the molecule with at least one further ethylenically unsaturated monomer containing no epoxide group in the molecule, at least one of the monomers being an ester of acrylic and/or of methacrylic acid. Polyacrylate resins of this type containing epoxide groups are described, for example, in EP-A-0 299 420, DE-B-22 14 650, DE-B-27 49 576, U.S. Pat. No. 4,091,048 and U.S. Pat. No. 3,781,379. As examples of ethylenically unsaturated monomers containing no epoxide group in the molecule, mention may be made of alkyl esters of acrylic and of methacrylic acid which contain 1 to 20 carbon atoms in the ester radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Other examples of ethylenically unsaturated monomers containing no epoxide groups in the molecule are: acid amides, for example acrylamide and methacrylamide, vinyl-aromatic compounds, such as styrene, alpha-methylstyrene and vinyltoluene, nitriles, such as acrylonitrile and methacrylonitrile, vinyl halides and vinylidene halides, such as vinyl chloride and vinylidene fluoride, vinyl esters such as vinyl acetate, and also hydroxyl-containing monomers, such as hydroxyethyl acrylate and hydroxyethyl methacrylate, for example.

The polyacrylate resin containing epoxide groups usually has an epoxide equivalent weight of from 400 to daltons, preferably from 400 to 1000 daltons, a number-average molecular weight (determined by gel permeation chromatography using polystyrene standard) of from 2000 to 20,000 daltons, preferably from 3000 to 10,000 daltons, and a glass transition temperature Tg of from 30 to 80 degrees C, preferably from 40 to 70 degrees C, particularly preferably from 40 to 60 degrees C (measured with the aid of differential scanning calorimetry DSC). Glass transition temperatures Tg of approximately 50 degrees C are very particularly preferred. In this case it is also possible to employ mixtures of two or more polyacrylate resins.

The polyacrylate resin containing epoxide groups can be prepared by polymerization in accordance with generally well-known methods.

Compounds suitable as hardener component B) are di- and/or polycarboxylic acids having at least one organosilyl group in the molecule, in which context the di- and polycarboxylic acids are, in the course of mixing with the epoxy resin and like the epoxy resin itself, preferably in the solid aggregate state.

It is particularly preferred as hardener component B) to employ aromatic dicarboxylic acids containing organosilyl groups, such as derivatives of phthalic acid and, with very particular preference, of terephthalic acid. Examples of organosilyl-containing terephthalic acid derivatives which may be mentioned are: 2-trimethylsilyl-terephthalic acid, 2-dimethyl-henylsilyl-terephthalic acid, 2-diphenylmethylsilyl-terephthalic acid, triphenylsilyl-terephthalic acid, 2,5-bis(trimethylsilyl)-terephthalic acid, 2,5-bis(dimethylphenylsilyl)-terephthalic acid, 2,5-bis(diphenylmethylsilyl)-terephthalic acid and 2,5-bis(triphenylsilyl)-terephthalic acid.

In another embodiment of the invention, the di- and/or polycarboxylic acids substituted with at least one organosilyl group are in a mixture with further low molecular mass di- and/or polycarboxylic acids B1) which contain no organosilyl groups as substituents. Saturated, straight-chain, aliphatic dicarboxylic acids having 3 to 20 carbon atoms in the molecule are particularly preferably suitable as low molecular mass di- and/or polycarboxylic acids B1). It is very particularly preferred to employ decane-1,12-dicarboxylic acid as component B1). In order to modify the properties of the finished coatings it is possible, if desired, also to employ other carboxyl-containing hardeners. Examples thereof which may be mentioned are saturated, branched or unsaturated, straight-chain di- and/or polycarboxylic acids and also polymers containing carboxyl groups.

The epoxy resin component A) is employed in the solid pulverulent component I of the novel powder coating dispersion normally in a quantity of from 50 to 95% by weight, preferably from 70 to 85% by weight, based on the powder coating I.

The hardener component B) is employed in the solid pulverulent component I of the novel powder coating dispersion normally in a quantity of from 5 to 50% by weight, preferably from 15 to 30% by weight, based on the powder coating I.

The solid pulverulent component I includes, if desired, one or more suitable catalysts for the epoxy resin curing, usually in proportions of from 0.001 to 5% by weight, preferably from 0.01 to 2% by weight, based on I. Examples of suitable catalysts are phosphonium salts of organic or inorganic acids, such as ethyltriphenylphosphonium chloride, ethyltriphenylphosphonium iodide, ethyltriphenylphosphonium cyanate, ethyltriphenylphosphonium acetate/acetic acid complex, tetrabutylphosphonium iodide, tetrabutylphosphonium bromide, tetrabutylphosphonium acetate/acetic acid complex and also further suitable phosphonium salts as described, for example, in U.S. Pat. No. 3,477,990 and U.S. Pat. No. 3,342,580, choline derivatives as described, for example, in EP-B-0 010 805, imidazole or imidazole derivatives, such as 2-methylimidazole, 2-styrylimidazole, 2-butylimidazole or 1-benzyl-2-methylimidazole and other imidazole derivatives, as described, for example, in BE-B-756 693, amines, such as primary, secondary or tertiary aminophenols, quaternary ammonium compounds, aluminum acetyl acetonate, toluenesulfonic acid salts, or mixtures of the abovementioned compounds.

The pulverulent component I can also contain, furthermore, from 0 to 55% by weight, preferably from 15 to 25% by weight, based on I, of fillers. Inorganic fillers are generally employed, for example titanium dioxide, such as Kronos® 2160 from Kronos Titan, Rutil® 902 from DuPont and RC 566 from Sachtleben, barium sulfate and silicate-based fillers, for example talc, kaolin, magnesium-aluminum silicates or mica. Preference is given to the use of titanium dioxide and fillers of the quartz sand type.

Moreover, the solid pulverulent component I may also contain from 0.01 to 10% by weight, preferably from 0.1 to 2% by weight, based on I, of other auxiliaries and additives, for example leveling agents, antioxidants, UV absorbers, free-radical scavengers, flow aids and degassing agents, for example benzoin. Suitable leveling agents are polyacrylates, polysiloxanes and/or fluorine-containing compounds. Antioxidants which can be employed are reducing agents, for example hydrazides and phosphorous compounds, and also free-radical scavengers, for example 2,6-di-tert-butylphenol or its derivatives and also 2,2,6,6-tetramethylpiperidine or its derivatives.

Preferred UV absorbers are triazines or benzotriazoles.

The aqueous component II contains the nonionic thickener D), which may be based, for example, on polyurethane, polyacrylate or modified cellulose. Component II may also include catalysts, leveling agents, antioxidants, UV absorbers, free-radical scavengers, and wetting agents, suitable compounds being essentially those already listed in the context of component I.

Furthermore, auxiliaries, defoaming agents, dispersion auxiliaries, biocides, solvents and neutralizing agents may also be added to component II, suitable defoaming agents being preferably modified polysiloxanes, examples of dispersion auxiliaries being ammonium salts or metal salts of polycarboxylates, and examples of suitable neutralizing agents being amines, ammonia or metal hydroxides.

The preparation of the aqueous powder coating dispersion

The solid pulverulent component I is prepared by known methods (compare for example: product information from BASF Lacke+Farben AG, "Pulverlacke" [Powder coatings], 1990) by homogenizing and dispersing components A), B) and, if used, C), for example by means of an extruder, screw compounder and similar equipment. Following the preparation of the component I it is prepared for dispersion by milling and, if appropriate, by classifying and sieving.

From the pulverulent solid component I it is then possible, with the aqueous component II, to prepare the novel powder coating dispersion by wet milling or by stirring dry-milled component I into the component II. Wet milling is particularly preferred.

The present invention also relates accordingly to a process for the preparation of an aqueous powder coating dispersion in which process an aqueous dispersion is prepared from a solid pulverulent component I and an aqueous component II, component I being a powder coating comprising:

A) at least one epoxy resin having an epoxide equivalent weight of from 300 to 5500 daltons, B) at least one di- and/or polycarboxylic acid as curing agent, comprising one or more organosilyl groups in the molecule, if desired in a mixture with other di- and/or polycarboxylic acids which contain no organosilyl group as substituent, and C) if desired, catalysts, fillers, auxiliaries and/or additives specific to powder coating, such as degassing agents, leveling agents, free-radical scavengers, antioxidants and/or UV absorbers, and component II being an aqueous dispersion comprising:

D) at least one nonionic thickener and

E) if desired, catalysts, auxiliaries, defoaming agents, dispersion auxiliaries, wetting agents, preferably carboxyl-containing dispersants, antioxidants, UV absorbers, free-radical scavengers, small quantities of solvents, leveling agents, biocides and/or water-retention agents the dispersion prepared from components I and II is adjusted to a viscosity of from 10 to 1000 Pas, preferably from 50 to 300 mPas, at a shear gradient of 500 s$^{-1}$, and to a solids content of from 10 to 50%, preferably from 20 to 40%, the dispersion prepared from components I and II is milled while maintaining a temperature of from 0 to 60 degrees C, preferably between 5 and 35 degrees C, and the pH of the dispersion is adjusted to 4 to 10, preferably to 5 to 9.

The mean particle size is between 1 and 25 micrometers, preferably below 20 micrometers, particularly preferably between 2 and 12 micrometers. The glass transition temperature of the powder coating is from 20 to 90 degrees C, preferably from 30 to 70 degrees C.

Before or after wet milling and/or before or after the introduction of the dry powder coating I into the aqueous component II it is possible to add to the dispersion from 0 to 5% by weight, based on the dispersion, of a mixture of a defoamer, an ammonium salt and/or alkali metal salt, a nonionic dispersion auxiliary, a wetting agent and/or a thickener and also other additives. Preferably, defoamers, dispersion auxiliaries, thickeners and wetting agents are first of all dispersed in water. Then small portions of the dry powder coating I are stirred in. Subsequently, defoamers, dispersion auxiliaries, thickeners and wetting agents are again incorporated by dispersion, after which the dry powder coating I is again stirred in.

In accordance with the invention the pH is preferably adjusted with ammonia or with amines. In this context the pH may initially rise so as to form a strongly basic dispersion. However, the pH falls over the course of several hours or days to the values indicated above of from 4 to 10, preferably 5 to 9.

Applications of the novel aqueous powder coating dispersions

The novel powder coating dispersion can be used in particular in the form of a clearcoat as a coating over basecoats, preferably in the automotive industry. A clearcoat dispersion of this kind is particularly suitable for aqueous basecoats based on a polyester resin, polyurethane resin and an amino resin. The novel powder coating dispersions can be applied using the methods known from liquid-coating technology. In particular, they can be applied by means of spray techniques. Also suitable are electrostatically assisted high-speed rotation or pneumatic application. The powder coating dispersions applied to the basecoat layer are in general flashed off prior to stoving. This is expediently effected first of all at room temperature and then at slightly elevated temperature. In general, the elevated temperature is from 40 to 70 degrees C, preferably from 50 to 65 degrees C. Flashing off is carried out at room temperature for from 2 to 10 minutes, preferably from 4 to 8 minutes, and then again for the same period of time at elevated temperature. Stoving can be carried out even at temperatures of from 130 to 180 degrees C, preferably at from 135 to 155 degrees C.

Using the novel powder coating dispersions it is possible, for example, to realize coat thicknesses of from 20 to 100 micrometers, preferably between 30 and 70 micrometers. In accordance with the prior art to date it has been possible to realize powder coating-based clearcoats of comparable quality only by applying a coat 65 to 80 micrometers thick.

Moreover, the novel powder coating dispersion can be used, for example, as a coating of packaging containers which may consist of a very wide variety of materials and may have a wide variety of sizes and shapes. For example, metallic containers are coated with the novel powder coating dispersions. These metal containers can have been produced by first of all rolling sheet metal and then joining it by bending at the edges. The end pieces can then be attached to the cylinders formed in this way. The novel powder coatings are employed both for covering the weld seam and for the interior coating of the containers, which in general already possess a bottom. Furthermore, deep-drawn metal containers can also be coated internally with the novel powder coating dispersions. However, the powder coating dispersions are of course also suitable for the coating of container lids and container bottoms.

The packaging containers may consist of a very wide variety of materials, for example aluminum, black plate, tinplate and various ferrous alloys, which are optionally provided with a passivating layer based on compounds of nickel, of chromium or of tin. Application of the powder coating dispersion takes place by known methods as are employed for liquid coating materials and as are described above by way of example.

In the example which follows, the preparation of a powder coating dispersion is set out schematically.

EXAMPLE

Preparation of the novel powder coating dispersion
The preparation process is as follows:
1. Weighing-in of components I and II:

Deionized water, thickeners, wetting agents and dispersants are initially introduced, as liquid component II, into a vessel with dissolver device. After adding the pulverulent component I, the batch is homogenized for 20 minutes at a peripheral disk speed of 20 m/s.

2. Initial flushing of the stirred ball mill:

Before the beginning of wet milling, the mill is flushed with a mixture of deionized water and the additives contained in the product until the machine is free from other solvents.

3. Wet milling:

The product batch prepared in step 1. is milled with the aid of the stirred ball mill. For this purpose the product is supplied to the mill by means of a pump and is circulated around the mill until the desired end quality particle-size distribution is reached at a specific energy input of about 60 Wh/kg. The maximum temperature reached is less than 25 degrees C.

4. Completion of the powder coating dispersion:

After wet milling, the powder coating dispersion is completed. This is done by adding further small additional quantities of additives (thickeners, wetting agents, neutralizing agents) with stirring.

5. Filtration:

The powder coating dispersion is first of all filtered in circulation with bag filters (PONG 50). Filtration is subsequently carried out in one pass over the same bag filter into a clean vessel. The powder coating dispersion is then dispensed into containers.

What is claimed is:

1. An aqueous powder coating dispersion comprising a solid, pulverulent component I and an aqueous component II, component I comprising:

A) at least one epoxy resin having an epoxide equivalent weight of from 300 to 5500 daltons B) a curing agent comprising at least one carboxylic acid selected from the group consisting of dicarboxylic acids comprising one or more organosilyl groups, polycarboxylic acids comprising one or more organosilyl groups, and mixtures thereof, and C) optionally, additives selected from the group consisting of catalysts, fillers, auxiliaries, degassing agents, leveling agents, free-radical scavengers, antioxidants, UV absorbers, and mixtures thereof, and component II comprising:

D) at least one nonionic thickener and

E) optionally, additives selected from the group consisting of catalysts, auxiliaries, defoaming agents, dispersion auxiliaries, wetting agents, antioxidants, UV absorbers, free-radical scavengers, solvents, leveling agents, biocides, water-retention agents and mixtures thereof.

2. The aqueous powder coating dispersion of claim 1, wherein component I comprises, based in each case on I:

from 50 to 95% by weight of compent A), from 5 to 50% by weight of component B) and from 0 to 10% by weight of component C), and component II comprises, based in each case on II:

from 0.1 to 10% by weight of component D) and from 0 to 10% by weight of component E).

3. The aqueous powder coating dispersion of claim 1, wherein component A) comprises an epoxy resin selected from the group consisting of epoxy resins resulting from the polymerization of bisphenol A, bisphenol F, and mixtures thereof, and having an epoxide equivalent weight of 500 to 2000 dalton, epoxy resins of the novolak type having an epoxide equivalent weight of from 500 to 1000 daltons, and mixtures thereof.

4. The aqueous powder coating dispersion of claim 1, wherein component A) comprises polyacrylates which contain epoxy groups and are prepared by copolymerizing at least one ethylenically unsaturated monomer which contains at least one epoxide group in the molecule with at least one further monomer containing no epoxide group in the molecule.

5. The aqueous powder coating dispersion of claim 1, wherein component B) comprises a carboxylic acid selected from the group consisting of aromatic dicarboxylic acids having at least one organsilyl group in the molecule, polycarboxylic acids having at least one organsilyl group in the molecule, and mixtures thereof.

6. The aqueous powder coating dispersion of claim 1, wherein component D) comprises a nonionic thickener based on a material selected from the group consisting of polyurethane, polyacrylate, modified cellulose and mixtures thereof.

7. A process for the preparation of the aqueous powder coating dispersions of claim 1, comprising preparing a powder coating dispersion from components I and II, and adjusting the powder coating dispersion to a viscosity of from 10 to 1000 mPas at a shear gradient of 500 s$^{-1}$, and to a solids content of from 10 to 50%.

8. The process of claim 7, comprising milling the powder coating dispersion prepared from components I and II while maintaining a temperature of from 0 to 60 degrees C.

9. The process of claim 7, further comprising adjusting the powder coating dispersion prepared from components I and II to a pH of from 4 to 10.

10. The process of claim 7, further comprising adjusting the powder coating dispersion to a mean particle size of not more than 20 micrometers.

11. A method for making a coated article, comprising providing an article to be coated, and coating the article with the aqueous powder coating dispersion of claim 1.

12. The method of claim 11, wherein the article comprises a basecoat.

13. The method of claim 12, wherein the substrate comprises an automotive component.

14. The method of claim 11, wherein the article is a packaging container.

15. The aqueous powder coating dispersion of claim 1, wherein component I comprises a powder coating and component II comprises an aqueous dispersion.

16. The aqueous powder coating dispersion of claim 1, wherein curing agent B) further comprises one or more carboxylic acids selected from the group consisting of dicarboxylic acids having no organosilyl groups, polycarboxylic acids having no organosilyl groups, and mixtures thereof.

17. The aqueous powder coating dispersion of claim 1, wherein component E comprises a carboxyl containing dispersant.

18. The process of claim 7, wherein the powder coating dispersion is adjusted to a viscosity of from 50 to 300 mPas and a solids content of from 20 to 40%.

19. The process of claim 8, comprising milling the powder coating dispersion prepared from components I and II while maintaining a temperature of from 5 to 35 degrees C.

20. The process of claim 9 further comprising adjusting the powder coating dispersion prepared from components I and II to a pH of from 5 to 9.

21. The process of claim 10, further comprising adjusting the powder coating dispersion to a mean particle size of from 2 to 12 micrometers.

22. An aqueous powder coating dispersion comprising a solid, pulverulent component I and an aqueous component II, component I comprising:

A) at least one epoxy resin having an epoxide equivalent weight of from 300 to 5500 daltons, B) a curing agent selected from the group consisting 2-trimethylsilyl-terephthalic acid , 2-dimethylphenylsilyl-terephthalic acid, 2-diphenylmethylsilyl-terephthalic acid, triphenylsilyl-terphthalic acid, 2,5-bis(trimethylsilyl)-terephthalic acid, 2,5-bis(dimethylphenylsilyl)-terephthalic acid, 2,5-bis(diphenylmethylsilyl)-terephthalic acid and 2,5-bis(triphenylsilyl)-terephthalic acid, and C) optionally, additives selected from the group consisting of catalysts, fillers, auxiliaries, degassing agents, leveling agents, free-radical scavengers, antioxidants, UV absorbers, and mixtures thereof, and component II comprising:

D) at least one nonionic thickener and

E) optionally, additive selected from the group consisting of catalysts, auxiliaries, defoaming agents, dispersion auxiliaries, wetting agents, antioxidants, UV absorbers, free-radical scavengers, solvents, leveling agents, biocides, water-retention agents and mixtures thereof.

* * * * *